UNITED STATES PATENT OFFICE.

LEISER GENANNT LORENZ DRESSLER, OF DRESDEN, GERMANY, ASSIGNOR TO EDUARD VOLLBEHR, OF DRESDEN-RÖCKNITZ, GERMANY.

DUST-BINDING COMPOSITION AND PROCESS OF MAKING SAME.

No. 842,636.     Specification of Letters Patent.     Patented Jan. 29, 1907.

Application filed August 10, 1906. Serial No. 329,959.

*To all whom it may concern:*

Be it known that I, LEISER (called LORENZ) DRESSLER, a subject of the Emperor of Austria, and a resident of Dresden, in the German Empire, have invented certain new and useful Improvements in Dust-Binding Compositions and Processes of Making Same, of which the following is a specification.

This invention has reference to a novel dust-binding composition and process of making same to be used for sprinkling streets or binding dust in closed spaces.

It is well known that oils may be transformed into emulsions. Such processes consist chiefly in mixing suitable, preferably viscous, substances together with oil. By these methods, however, only small quantities could be produced, the expense of making them being too high.

It is the special object of this invention to produce a highly-effective composition for binding dust and provide a cheap process by means of which large quantities are easily made. This desirable result is attained by adding glycerin to other emulsifiable substances. I have discovered that the addition of glycerin to certain substances adapted to produce an emulsion with oil will, in combination with said substances, produce easily large quantities of dust-binding composition at ordinary temperature without the application of heat by simply stirring them together. No mechanical appliances are required and no skilled labor is necessary for making the composition, which also decreases the cost of the product.

The constituents effecting the emulsion are glycerin, dextrin, gum-arabic, milk, and salt, to which may be added any kind of oil at ordinary temperature. The emulsion thus obtained may be diluted slightly and intimately with water. The proportions in which the above ingredients are mixed are preferably as follows: For making one hundred parts of the dust-binding composition I use seventy-eight per cent. of oil, four per cent. of glycerin, one per cent. of gum-arabic, two per cent. of dextrin, ten per cent. of milk, one per cent. of salt, and four per cent. of water. The resulting composition does not decompose and will keep in good condition for a long time.

Having thus described my invention, I claim as new and desire to secure by Letters Patent—

1. As a novel composition of matter a dust-binding emulsion for sprinkling streets, &c., composed of glycerin, dextrin, gum-arabic, milk, salt and oil and existing in the form of a liquid which may be diluted with water to a certain extent.

2. As a novel composition of matter a dust-binding emulsion for sprinkling streets, &c., composed of about seventy-eight per cent. of oil, four per cent. of glycerin, one per cent. of gum-arabic, two per cent. of dextrin, ten per cent. of milk, one per cent. of salt, and four per cent. of water and existing in form of a liquid.

In witness whereof I have hereunto set my hand in the presence of two witnesses.

LEISER GENANNT LORENZ DRESSLER.

Witnesses:
PAUL E. SCHILLING,
PAUL ARRAS.